(12) United States Patent
Ichikawa et al.

(10) Patent No.: US 11,373,806 B2
(45) Date of Patent: Jun. 28, 2022

(54) FILM CAPACITOR HAVING A DELECTRIC RESIN WITH A SPECIFIC CROSSLINK DENSITY AND FILM FOR FILM CAPACITOR

(71) Applicant: Murata Manufacturing Co., Ltd., Nagaokakyo (JP)

(72) Inventors: Tomomichi Ichikawa, Nagaokakyo (JP); Tomoki Inakura, Nagaokakyo (JP); Shinichi Kobayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 93 days.

(21) Appl. No.: 16/814,095

(22) Filed: Mar. 10, 2020

(65) Prior Publication Data
US 2020/0211772 A1 Jul. 2, 2020

Related U.S. Application Data

(63) Continuation of application No. PCT/JP2018/022892, filed on Jun. 15, 2018.

(30) Foreign Application Priority Data

Nov. 15, 2017 (JP) .............................. JP2017-220109

(51) Int. Cl.
*H01G 4/18* (2006.01)
*H01G 4/33* (2006.01)

(52) U.S. Cl.
CPC .................. *H01G 4/18* (2013.01); *H01G 4/33* (2013.01)

(58) Field of Classification Search
CPC .................................... H01G 4/18; H01G 4/33
See application file for complete search history.

(56) References Cited

U.S. PATENT DOCUMENTS

| 2,593,829 A * | 4/1952 | Arledter .................. H01G 4/18 |
| | | 361/303 |
| 6,287,667 B1 | 9/2001 | Kinoshita et al. |
| 7,384,690 B2 | 6/2008 | Machida et al. |
| 9,105,408 B2 | 8/2015 | Ichikawa et al. |
| 9,156,930 B2 | 10/2015 | Koh et al. |
| 2005/0020803 A1 | 1/2005 | Machida et al. |
| 2008/0305316 A1 | 12/2008 | Kaneshiro et al. |

(Continued)

FOREIGN PATENT DOCUMENTS

| CN | 1630680 A | 6/2005 |
| CN | 201402744 Y | 2/2010 |

(Continued)

OTHER PUBLICATIONS

International Search Report Issued for PCT/JP2018/022892, dated Sep. 11, 2018.

(Continued)

*Primary Examiner* — David M Sinclair
(74) *Attorney, Agent, or Firm* — ArentFox Schiff LLP

(57) ABSTRACT

A film capacitor that includes a dielectric resin film and a metal layer on one surface of the dielectric resin film. The dielectric resin film has a crosslink density at 225° C. of 2700 mol/m³ or more, or the dielectric resin film has a storage elastic modulus at 125° C. of 1.1 GPa or more.

10 Claims, 1 Drawing Sheet

(56) References Cited

U.S. PATENT DOCUMENTS

| 2011/0181998 | A1* | 7/2011 | Yang | H01G 2/16 |
| | | | | 361/275.4 |
| 2012/0008250 | A1* | 1/2012 | Ichikawa | H01G 4/206 |
| | | | | 361/303 |
| 2013/0188293 | A1 | 7/2013 | Koh et al. | |
| 2014/0050913 | A1 | 2/2014 | Nakahiro et al. | |
| 2014/0368970 | A1 | 12/2014 | Ichikawa et al. | |

FOREIGN PATENT DOCUMENTS

| CN | 103119671 A | 5/2013 |
| JP | H08250373 A | 9/1996 |
| JP | 2003160727 A | 6/2003 |
| JP | 2012182162 A | 9/2012 |
| JP | 2012246372 A | 12/2012 |
| JP | 201411219 A | 1/2014 |
| JP | 5794380 B2 | 10/2015 |
| WO | 2013069485 A1 | 5/2013 |
| WO | 2013128726 A1 | 9/2013 |

OTHER PUBLICATIONS

Written Opinion of the International Searching Authority issued for PCT/JP2018/022892, dated Sep. 11, 2018.
European Communication with extended European Search Report for EP Application No. 18 87 7649.6, dated Sep. 1, 2021.

\* cited by examiner

FILM CAPACITOR HAVING A DELECTRIC RESIN WITH A SPECIFIC CROSSLINK DENSITY AND FILM FOR FILM CAPACITOR

CROSS REFERENCE TO RELATED APPLICATIONS

The present application is a continuation of International application No. PCT/JP2018/022892, filed Jun. 15, 2018, which claims priority to Japanese Patent Application No. 2017-220109, filed Nov. 15, 2017, the entire contents of each of which are incorporated herein by reference.

FIELD OF THE INVENTION

The present invention relates to a film capacitor and a film for a film capacitor.

BACKGROUND OF THE INVENTION

As one kind of a capacitor, there is a film capacitor that has a structure with first and second counter electrodes opposed to each other with a flexible resin film as a dielectric interposed therebetween. A film capacitor typically has a form of an approximately cylindrical shape obtained by winding the resin film serving as the dielectric. First and second external terminal electrodes are formed respectively on first and second end surfaces of the cylinder that oppose each other. The first counter electrode is electrically connected to the first external terminal electrode, and the second counter electrode is electrically connected to the second external terminal electrode.

As a dielectric resin film for the film capacitor, it is described, for example, Patent Document 1 to use a dielectric resin film made of a thermosetting resin. A resin composition constituting the dielectric resin film described in Patent Document 1 is a cured product obtained by a reaction of at least two types of organic materials including a first organic material and a second organic material. The first organic material is polyol, and the second organic material is an isocyanate compound, an epoxy resin, or a melamine resin having a plurality of functional groups in the molecule. The resin composition includes a first atom group including at least one functional group selected from among a methylene group ($CH_2$ group), an aromatic ring and an ether group (—O— group) and having a relatively small molar polarizability; and a second atom group including at least one functional group selected from among a hydroxyl group (OH group), an amino group (NH group) and a carbonyl group (C=O group) and having a relatively large molar polarizability, and the resin composition is characterized in that a value calculated from the formula (sum of absorption band intensities of first atom group)/(sum of absorption band intensities of second atom group) is 1.0 or more.

Patent Document 1: Japanese Patent No. 5794380

SUMMARY OF THE INVENTION

In recent years, film capacitors are required to have heat resistance that enables long-term use in a high temperature environment of 125° C. or higher.

Patent Document 1 describes that when a cured product is obtained by a reaction of at least two types of organic materials, a glass transition point of a resin composition can be made 130° C. or higher, and therefore heat resistance of the dielectric resin film is increased and a guaranteed temperature of the film capacitor can be made high, for example, 125° C. or higher.

However, the dielectric resin film made of the resin composition described in Patent Document 1 has been evaluated for heat resistance based on the glass transition point, and heat resistance that enables long-term use in a high temperature environment has not been studied.

The present invention has been made to solve the above problems, and an object thereof is to provide a long-life film capacitor that can be used for a long period of time in a high temperature environment, and a film for a film capacitor.

A film capacitor of the present invention includes a dielectric resin film and a metal layer on one surface of the dielectric resin film.

In a first aspect of a film capacitor of the present invention, the dielectric resin film has a crosslink density at 225° C. of 2700 mol/m³ or more, the crosslink density at 225° C. being calculated by the following formula:

$$n = E'/3\Phi RT,$$

wherein n is the crosslink density of the dielectric resin film, E' is a storage elastic modulus at 225° C. of the dielectric resin film, T is 498 K corresponding to an absolute temperature of 225° C., Φ is a front coefficient, and R is 8.31 J/mol·K which corresponds to the universal gas constant.

In the first aspect of the film capacitor of the present invention, the crosslink density is preferably 5600 mol/m³ or less, more preferably 3000 mol/m³ to 5400 mol/m³.

In a second aspect of the film capacitor of the present invention, the dielectric resin film has a storage elastic modulus at 125° C. of 1.1 GPa or more.

In the second aspect of the film capacitor of the present invention, the storage elastic modulus is preferably 1.6 GPa or less. The storage elastic modulus is also preferably 1.3 GPa or more.

Hereinafter, when the first aspect and the second aspect of the film capacitor of the present invention are not distinguished particularly, they are simply referred to as "film capacitor of the present invention".

In the film capacitor of the present invention, the dielectric resin film is preferably mainly composed of a resin having at least one of a urethane bond and a urea bond.

In the film capacitor of the present invention, the dielectric resin film may be mainly composed of a curable resin.

In the film capacitor of the present invention, the dielectric resin film may include at least one of an isocyanate group and a hydroxyl group.

In the film capacitor of the present invention, the dielectric resin film preferably has a thickness of 1 μm to 10 μm.

In the film capacitor of the present invention, the metal layer preferably has a fuse portion.

In a first aspect, a film for a film capacitor of the present invention has a crosslink density at 225° C. of 2700 mol/m³ or more, the crosslink density at 225° C. being calculated by the following formula:

$$n = E'/3\Phi RT,$$

wherein n is the crosslink density of the film, E' is a storage elastic modulus at 225° C. of the film, T is 498 K which corresponds to an absolute temperature of 225° C., Φ is a front coefficient, and R is 8.31 J/mol·K which corresponds to the universal gas constant.

In the first aspect of the film for a film capacitor of the present invention, the crosslink density is preferably 5600 mol/m³ or less, more preferably 3000 mol/m³ to 5400 mol/m³.

In a second aspect, the film for a film capacitor of the present invention has a storage elastic modulus at 125° C. of 1.1 GPa or more.

In the second aspect of the film for a film capacitor of the present invention, the storage elastic modulus is preferably 1.6 GPa or less. The storage elastic modulus is also preferably 1.3 GPa or more.

Hereinafter, when the first aspect and the second aspect of the film for a film capacitor of the present invention are not distinguished particularly, they are simply referred to as "film for a film capacitor of the present invention".

The film for a film capacitor of the present invention is preferably mainly composed of a resin having at least one of a urethane bond and a urea bond.

The film for a film capacitor of the present invention may be mainly composed of a curable resin.

The film for a film capacitor of the present invention may include at least one of an isocyanate group and a hydroxyl group.

The film for a film capacitor of the present invention preferably has a thickness of 1 μm to 10 μm.

In the film for a film capacitor of the present invention, a metal layer having a fuse portion is preferably provided on one surface of the film.

The present invention can provide a long-life film capacitor that can be used for a long period of time in a high temperature environment, and a film for a film capacitor.

DETAILED DESCRIPTION OF THE INVENTION

Hereinafter, a film capacitor of the present invention and a film for a film capacitor will be described.

However, the present invention is not limited to the configurations described below, and various modifications can be made without departing from the scope of the present invention.

The present invention also encompasses a combination of two or more desired structures of the present invention described below.

[Film Capacitor]

The film capacitor of the present invention includes a dielectric resin film and a metal layer provided on one surface of the dielectric resin film.

Hereinafter, as one embodiment of the film capacitor of the present invention, there will be described an example of a wound film capacitor formed by stacking a first dielectric resin film provided with a first metal layer and a second dielectric resin film provided with a second metal layer, and then winding the stack.

The film capacitor of the present invention may also be a stacked film capacitor formed by stacking the first dielectric resin film provided with the first metal layer and the second dielectric resin film provided with the second metal layer.

Figure 1:
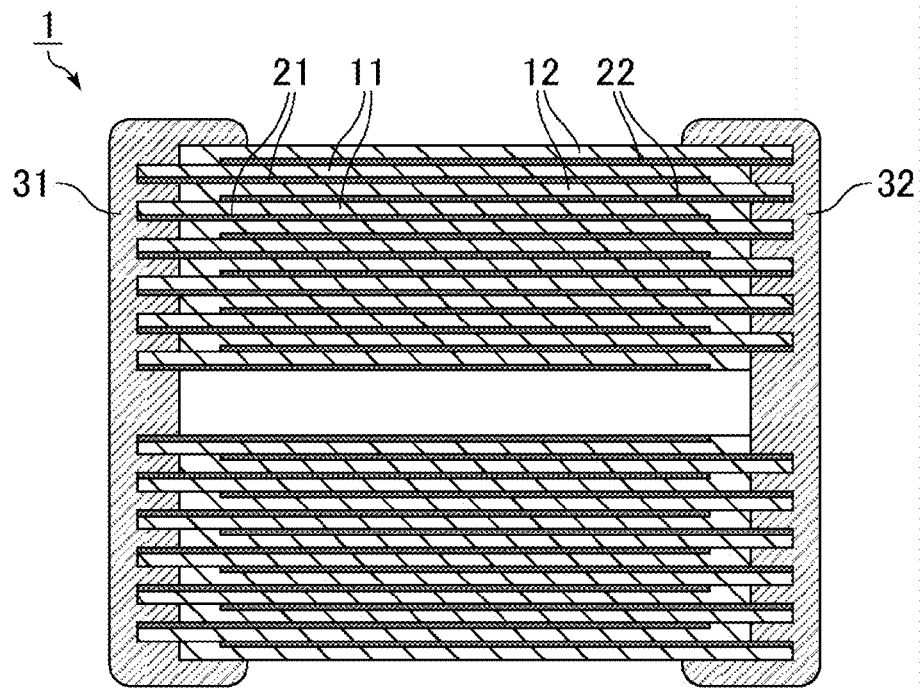
FIG. 1 is a cross-sectional view schematically showing an example of a film capacitor of the present invention.

FIG. 1 is a cross-sectional view schematically showing an example of the film capacitor of the present invention.

The film capacitor 1 shown in FIG. 1 is a wound film capacitor, includes a first dielectric resin film 11 and a second dielectric resin film 12 in a wound state, and a first metal layer (first counter electrode) 21 and a second metal layer (second counter electrode) 22 facing each other across the first dielectric resin film 11 and the second dielectric resin film 12, and further includes a first external terminal electrode 31 electrically connected to the first metal layer 21 and a second external terminal electrode 32 electrically connected to the second metal layer 22.

The first metal layer 21 is formed on the first dielectric resin film 11, and the second metal layer 22 is formed on the second dielectric resin film 12. The film capacitor 1 is configured by being wound in a state where the first dielectric resin film 11 formed with the first metal layer 21 and the second dielectric resin film 12 formed with the second metal layer 22 are stacked. The second dielectric resin film 12 may have a configuration different from the first dielectric resin film 11, but preferably has the same configuration as the first dielectric resin film 11.

The first metal layer 21 is formed to reach one side edge on one surface of the first dielectric resin film 11 but not to reach the other side edge. On the other hand, the second metal layer 22 is formed not to reach one side edge on one surface of the second dielectric resin film 12 but to reach the other side edge. The first metal layer 21 and the second metal layer 22 are made of, for example, an aluminum layer.

As shown in FIG. 1, the first dielectric resin film 11 and the second dielectric resin film 12 are stacked while being shifted from each other in a width direction so that both an end of the first metal layer 21 on the side reaching a side edge of the first dielectric resin film 11 and an end of the second metal layer 22 on the side reaching a side edge of the second dielectric resin film 12 are exposed from a stacked film. When the first dielectric resin film 11 and the second dielectric resin film 12 are wound in the stacked state, the first metal layer 21 and the second metal layer 22 are in a stacked state while maintaining the state of being exposed at their ends.

In the film capacitor 1 shown in FIG. 1, the second dielectric resin film 12 is wound to be outside the first dielectric resin film 11, and the first dielectric resin film 11 and the second dielectric resin film 12 are wound such that the first metal layer 21 and the second metal layer 22 face inward.

The first external terminal electrode 31 and the second external terminal electrode 32 are formed, for example, by spraying zinc or the like on each end surface of a capacitor body obtained as described above. The first external terminal electrode 31 is in contact with the exposed end portion of the first metal layer 21, thereby being electrically connected to the first metal layer 21. On the other hand, the second external terminal electrode 32 is in contact with the exposed end portion of the second metal layer 22, thereby being electrically connected to the second metal layer 22.

In the film capacitor of the present invention, it is preferable that a wound body of the dielectric resin film be pressed into a flat shape such as an ellipse or oval in a cross-sectional shape to have a more compact shape. The film capacitor of the present invention may be provided with a cylindrical winding shaft. The winding shaft is disposed on a center axis of the wound dielectric resin film, and serves as a winding shaft when the dielectric resin film is wound.

In the film capacitor of the present invention, examples of the metal contained in the metal layer include aluminum (Al), titanium (Ti), zinc (Zn), magnesium (Mg), tin (Sn), and nickel (Ni).

In the film capacitor of the present invention, the thickness of the metal layer is not particularly limited, but is, for example, 5 nm to 40 nm.

The thickness of the metal layer can be specified by observing a cross section, obtained by cutting the dielectric resin film provided with the metal layer along the thickness direction, with an electron microscope such as a field emission scanning electron microscope (FE-SEM).

In the film capacitor of the present invention, the film for a film capacitor of the present invention is used as the dielectric resin film.

[Film for Film Capacitor]
(First Aspect)

In a first aspect, the film for a film capacitor of the present invention has a crosslink density at 225° C. of 2700 mol/m³ or more.

The inventors of the present invention have found that when a film capacitor including a film having a low crosslink density is used for a long period of time in a high temperature environment, a current concentrates in the scarcely cross-linked parts so that the temperature of the part becomes high and the part deteriorates. In the film for a film capacitor according to the first aspect of the present invention, by increasing the crosslink density of the film at 225° C., it is possible to suppress a decrease in electrostatic capacitance even when the film is used for a long period of time in a high temperature environment.

The crosslink density at 225° C. is a value calculated by the following formula:

$$n = E'/3\Phi RT$$

In the formula, n is the crosslink density (mol/m³) of the film, E' is a storage elastic modulus (Pa) at 225° C. of the film, T is 498 K which corresponds to an absolute temperature of 225° C., $\Phi$ is a front coefficient ($\Phi \approx 1$), and R represents 8.31 J/mol·K which corresponds to the universal gas constant. The storage elastic modulus at 225° C. can be measured using a dynamic mechanical analyzer (DMA). In the above formula, the crosslink density is calculated with the front coefficient being $\Phi=1$.

In the film for a film capacitor according to the first aspect of the present invention, the upper limit of the crosslink density is not particularly limited, but the crosslink density is preferably 5600 mol/m³ or less because the film becomes brittle if the crosslink density becomes too high.

From the viewpoint of suppressing a decrease in electrostatic capacitance, the crosslink density is more preferably 3000 mol/m³ to 5400 mol/m³.

In the film for a film capacitor according to the first aspect of the present invention, from the viewpoint of suppressing a decrease in electrostatic capacitance, the storage elastic modulus at 125° C. is preferably 1.1 GPa or more, more preferably 1.3 GPa or more.

The storage elastic modulus at 125° C. is a value measured by the method described in the second aspect.

In the film for a film capacitor according to the first aspect of the present invention, the upper limit of the storage elastic modulus at 125° C. is not particularly limited, but the storage elastic modulus is preferably 1.6 GPa or less because the film becomes brittle if the storage elastic modulus becomes too high.

In the film for a film capacitor according to the first aspect of the present invention, a glass transition point is preferably 130° C. or higher from the viewpoint of ensuring heat resistance.

The storage elastic modulus and a loss elastic modulus are measured with a dynamic mechanical analyzer (DMA), and the glass transition point is a temperature at which a loss tangent (tan δ) represented by loss elastic modulus/storage elastic modulus shows a maximum peak value.

(Second Aspect)

In a second aspect, the film for a film capacitor of the present invention has a storage elastic modulus at 125° C. of 1.1 GPa or more.

In the film for a film capacitor according to the second aspect of the present invention, by increasing the storage elastic modulus at 125° C., it is possible to suppress a decrease in electrostatic capacitance even when the film is used for a long period of time in a high temperature environment.

The storage elastic modulus at 125° C. is a value measured using a dynamic mechanical analyzer (DMA).

In the film for a film capacitor according to the second aspect of the present invention, the upper limit of the storage elastic modulus at 125° C. is not particularly limited, but the storage elastic modulus is preferably 1.6 GPa or less because the film becomes brittle if the storage elastic modulus becomes too high.

From the viewpoint of suppressing a decrease in electrostatic capacitance, the storage elastic modulus at 125° C. is preferably 1.3 GPa or more.

In the film for a film capacitor according to the second aspect of the present invention, from the viewpoint of suppressing a decrease in electrostatic capacitance, the crosslink density at 225° C. is preferably 2700 mol/m³ or more.

The crosslink density at 225° C. is a value calculated by the method described in the first aspect.

In the film for a film capacitor according to the second aspect of the present invention, the upper limit of the crosslink density is not particularly limited, but the crosslink density is preferably 5600 mol/m³ or less because the film becomes brittle if the crosslink density becomes too high.

From the viewpoint of suppressing a decrease in electrostatic capacitance, the crosslink density is more preferably 3000 mol/m³ to 5400 mol/m³.

In the film for a film capacitor according to the second aspect of the present invention, a glass transition point is preferably 130° C. or higher from the viewpoint of ensuring heat resistance.

As described above, when the first aspect and the second aspect of the film for a film capacitor of the present invention are not distinguished particularly, they are simply referred to as "film for a film capacitor of the present invention".

The film for a film capacitor of the present invention is preferably mainly composed of a resin having at least one of a urethane bond and a urea bond. Examples of such a resin include a urethane resin having a urethane bond and a urea resin having a urea bond. The resin may have both the urethane bond and the urea bond. Specific examples include curable resins and vapor-deposited polymer films described later.

The presence of urethane bonds and/or urea bonds can be confirmed using a Fourier transform infrared spectrophotometer (FT-IR).

In the present specification, the "main component" means a component having the highest abundance ratio (% by weight), preferably a component having an abundance ratio exceeding 50% by weight. Therefore, the film for a film capacitor of the present invention may contain, as components other than the main component, for example, an additive such as a silicone resin or an uncured portion of a starting material such as a first organic material and a second organic material described later.

The film for a film capacitor of the present invention may be mainly composed of a curable resin. The curable resin may be a thermosetting resin or a photocurable resin. The curable resin may or may not have at least one of a urethane bond and a urea bond.

In the present description, the thermosetting resin means a resin that can be cured by heat, and does not limit the curing method. Therefore, as long as the resin can be cured by heat, a resin cured by a method other than heat (for example, light, electron beam, etc.) is also included in the thermosetting resin. Depending on the material, the reaction may start due to reactivity of the material itself, and resins gradually cured without necessarily applying heat or light from the outside are also regarded as thermosetting resins. The same applies to the photocurable resin, and the curing method is not limited.

The film for a film capacitor of the present invention may be mainly composed of a vapor-deposited polymer film. The vapor-deposited polymer film may or may not have at least one of a urethane bond and a urea bond. The vapor-deposited polymer film is basically included in the curable resin.

The film for a film capacitor of the present invention is preferably made of a cured product of the first organic material and the second organic material. Examples of the cured product include a cured product obtained by reacting a hydroxyl group (OH group) of the first organic material with an isocyanate group (NCO group) of the second organic material.

When a cured product is obtained by the above reaction, an uncured portion of a starting material may remain in the film. For example, the film for a film capacitor of the present invention may include at least one of an isocyanate group (NCO group) and a hydroxyl group (OH group). In this case, the film for a film capacitor of the present invention may contain either an isocyanate group or a hydroxyl group, or may contain both an isocyanate group and a hydroxyl group.

The presence of isocyanate groups and/or hydroxyl groups can be confirmed using a Fourier transform infrared spectrophotometer (FT-IR).

The first organic material is preferably a polyol having a plurality of hydroxyl groups (OH groups) in the molecule. Examples of the polyol include polyether polyol, polyester polyol, and polyvinyl acetoacetal.

Two or more organic materials may be used in combination as the first organic material. Among the first organic materials, a phenoxy resin belonging to the polyether polyol is preferable.

The second organic material is preferably an isocyanate compound, epoxy resin or melamine resin having a plurality of functional groups in the molecule. Two or more organic materials may be used in combination as the second organic material.

Examples of the isocyanate compound include aromatic polyisocyanates such as diphenylmethane diisocyanate (MDI) and tolylene diisocyanate (TDI), and aliphatic polyisocyanates such as hexamethylene diisocyanate (HDI). A modified product of these polyisocyanates, for example, a modified product having carbodiimide or urethane may be used. Among them, aromatic polyisocyanate is preferable, and MDI is more preferable.

The epoxy resin is not particularly limited as long as it has an epoxy ring, and examples thereof include bisphenol A type epoxy resin, biphenyl skeleton epoxy resin, cyclopentadiene skeleton epoxy resin, and naphthalene skeleton epoxy resin.

The melamine resin is not particularly limited as long as it is an organic nitrogen compound having a triazine ring at the center of the structure and three amino groups around the triazine ring, and examples thereof include alkylated melamine resins. Other modified products of melamine may be employed.

The film for a film capacitor of the present invention is preferably obtained by forming a resin solution containing the first organic material and the second organic material into a film, and then curing the film by heat treatment.

The film for a film capacitor of the present invention can also contain an additive for adding other functions. For example, smoothness can be imparted by adding a leveling agent. The additive is more preferably a material that has a functional group reacting with a hydroxyl group and/or an isocyanate group and forms a portion of a crosslinked structure of a cured product. Examples of such a material include a resin having at least one functional group selected from the group consisting of an epoxy group, a silanol group, and a carboxyl group.

The thickness of the film for a film capacitor of the present invention is not particularly limited. However, if the film is too thin, it tends to be brittle. On the other hand, if the film is too thick, defects such as cracks are likely to occur during film formation. Thus, the film for a film capacitor of the present invention preferably has a thickness of 1 μm to 10 μm.

The thickness of a film means the thickness of the film alone not including the thickness of a metal layer. The thickness of the film can be measured using an optical film thickness meter.

In the film for a film capacitor of the present invention, a metal layer may be provided on one surface. In this case, a metal layer having a fuse portion is preferably provided on one surface.

The fuse portion means a portion which connects electrode portions in which the metal layer used as a counter electrode is divided into plural portions. A pattern of the metal layer having the fuse portion is not particularly limited, and for example, an electrode pattern disclosed in Japanese Patent Application Laid-Open Nos. 2004-363431 and H05-251266 can be used.

Figure 2:
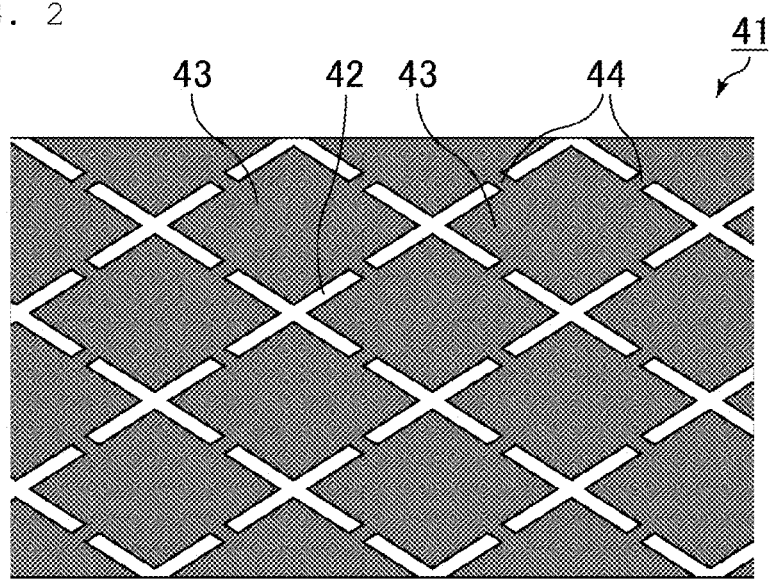
FIG. 2 is a plan view schematically showing an example of a metal layer having a fuse portion.

FIG. 2 is a plan view schematically showing an example of a metal layer having a fuse portion.

In FIG. 2, dividing slits 42 having no metal portion are provided in a lattice shape in a metal layer 41, whereby the metal layer 41 is divided into fine electrode portions 43. The electrode portions 43 are connected in parallel by the fuse portions 44 partially formed in the dividing slits 42.

Although the film capacitor of the present invention can be applied to known applications, the film capacitor can be used for a long time in a high temperature environment, and the life of equipment can be extended. Therefore, the film capacitor is suitably used for power electronics equipment such as electric compressors/pumps, chargers, DC-DC converters, and drive inverters, which are mounted in automobiles and industrial equipment.

EXAMPLES

Hereinafter, examples specifically showing the film capacitor of the present invention will be described.

The present invention is not limited to only these examples.

It takes time to demonstrate deterioration of the film by a long-time test. Therefore, in the following examples, for convenience, a film capacitor provided with a pattern of a metal layer having a fuse portion was produced, and the effect of the present invention was confirmed.

Example 1

[Production of Film Capacitor]

Samples 1 to 11 were prepared under the conditions shown in Table 1.

A phenoxy resin was provided as a first organic material (shown as organic material 1 in Table 1), and diphenylmethane diisocyanate (MDI) was provided as a second organic material (shown as organic material 2 in Table 1). As the phenoxy resin, a phenoxy resin which was a high molecular weight bisphenol A type epoxy resin having an epoxy group at the terminal was used. Diphenylmethane diisocyanate was used as MDI.

Next, a resin solution obtained by mixing the first organic material and the second organic material was molded on a PET film with a doctor blade coater to obtain an uncured film. The film was heat-treated and cured under conditions shown in Table 1 to obtain a dielectric resin film (hereinafter also simply referred to as a film). The film thickness after curing was 3 μm. The cured film was a urethane resin having a urethane bond, and was also a urea resin having a urea bond.

Aluminum to be a counter electrode (metal layer) was deposited on the film surface so as to have a thickness of 20 nm, and peeled from a PET substrate to obtain a metallized film. After the metallized film was wound, an external electrode was formed from sprayed metal to produce a 20 μF film capacitor.

With respect to the dielectric resin films constituting the film capacitors of Samples 1 to 11, the storage elastic modulus and glass transition point of each dielectric resin film were measured.

The storage elastic modulus of the film after thermosetting was measured by DMA (dynamic mechanical analyzer, "RSA-III" manufactured by TA INSTRUMENTS). Measurement conditions were that the temperature was raised from room temperature to 250° C. at a rate of temperature rise of 10° C./min, the wave number was 10 rad/sec, and the strain was 0.1%.

The temperature at which a loss tangent tan δ=loss elastic modulus/storage elastic modulus showed a maximum peak value was defined as a glass transition point (Tg).

A crosslink density n (mol/m$^3$) at 225° C. was calculated using the following formula:

$$n = E'/3\Phi RT$$

E': Measured value of storage elastic modulus at 225° C. (Pa)

T: Absolute temperature 498 (K) at 225° C.

Φ: Front coefficient

R: Gas constant 8.31 (J/mol·K)

[Judgment Method]

The following tests were performed on the film capacitors of Samples 1 to 11.

In Judgment 1, a test was conducted in which the film capacitor was left at 125° C. for 10 hours. A case where a rate of change in electrostatic capacitance before and after the test was 5% or more was evaluated as x (poor), and a case where the rate of change in electrostatic capacitance was less than 5% was evaluated as ○ (good).

In Judgment 2, a high-temperature load test was performed at 125° C. and 450 V. The electrostatic capacitance after 100 hours was measured, a case where a rate of change in electrostatic capacitance before and after loading was 5% or more was evaluated as x (poor), a case where the rate of change in electrostatic capacitance was 1% or more and less than 5% was evaluated as ○ (good), and a case where the rate of change in electrostatic capacitance was less than 1% was evaluated as ⊙ (excellent).

As Judgment 3, a bending test of the dielectric resin film constituting each film capacitor was performed. Ten strip-shaped test pieces of 1 cm×5 cm were prepared, the bending test was performed ten times for each test piece, and whether or not the test piece was broken was confirmed. A case where the number of breaks was 0 was evaluated as ○ (good), a case where the number of breaks was 1 to 3 was evaluated as Δ (not so good), and a case where the number of breaks was 4 or more was evaluated as x (poor).

TABLE 1

| Sample No. | Organic material 1 Phenoxy [wt %] | Organic material 2 MDI [wt %] | Heat treatment condition | Storage elastic modulus E'@125° C. [GPa] | Tg [° C.] | Storage elastic modulus E'@225° C. [Pa] | Crosslink density [mol/m$^3$] | Judgment 1 | Judgment 2 | Judgment 3 |
|---|---|---|---|---|---|---|---|---|---|---|
| *1 | 70 | 30 | 180° C./2 h | 1.0 | 165 | 2.9 × 10$^7$ | 2336 | ○ | X | ○ |
| *2 | 50 | 50 | 180° C./2 h | 1.0 | 175 | 3.3 × 10$^7$ | 2658 | ○ | X | ○ |
| *3 | 30 | 70 | 180° C./2 h | 1.0 | 190 | 3.2 × 10$^7$ | 2577 | ○ | X | ○ |
| 4 | 70 | 30 | 180° C./5 h | 1.1 | 170 | 3.4 × 10$^7$ | 2739 | ○ | ○ | ○ |
| *5 | 90 | 10 | 180° C./10 h | 1.0 | 140 | 2.0 × 10$^7$ | 1611 | ○ | X | ○ |
| 6 | 75 | 25 | 180° C./10 h | 1.3 | 170 | 3.8 × 10$^7$ | 3061 | ○ | ⊙ | ○ |
| 7 | 70 | 30 | 180° C./10 h | 1.3 | 185 | 4.9 × 10$^7$ | 3947 | ○ | ⊙ | ○ |
| 8 | 60 | 40 | 180° C./10 h | 1.5 | 196 | 6.3 × 10$^7$ | 5074 | ○ | ⊙ | ○ |
| 9 | 50 | 50 | 180° C./10 h | 1.5 | 200 | 6.7 × 10$^7$ | 5397 | ○ | ⊙ | ○ |
| 10 | 40 | 60 | 180° C./10 h | 1.6 | 205 | 5.3 × 10$^7$ | 4269 | ○ | ⊙ | ○ |
| 11 | 50 | 50 | 180° C./48 hr | 1.7 | 220 | 7.0 × 10$^7$ | 5638 | ○ | ○ | Δ |

In Table 1, those samples with an asterisk (*) before to their numbers are comparative examples, outside the scope of the present invention.

In the method of Judgment 1, the results of all samples were evaluated as ○.

On the other hand, in the method of Judgment 2, the results of Samples 1 to 3 and 5 having a crosslink density of less than 2700 mol/m³ were evaluated as x, whereas the results of Samples 4, and 6 to 11 having a crosslink density of 2700 mol/m³ or more were evaluated as ○ or ⊚. In particular, the results of Samples 6 to 10 having a crosslink density of 3000 mol/m³ to 5400 mol/m³ were evaluated as ⊚.

From these results, it is considered that in a film capacitor using a film having a low crosslink density, when a voltage continues to be applied at a high temperature, a current concentrates in scarcely cross-linked parts, so that deterioration progresses over time, and eventually dielectric breakdown occurs in the scarcely cross-linked parts, whereby the fuse portion is blown. A particularly remarkable effect was observed when the crosslink density was 3000 mol/m³ or more. However, this is thought to be because the number of sites that are more likely to break down decreases as the crosslink density increases, and the decrease in electrostatic capacitance can be suppressed.

In the method of Judgment 3, the result of Sample 11 having a crosslink density exceeding 5600 mol/m³ was evaluated as Δ. This is presumably because the film becomes brittle when the crosslink density becomes too high.

Example 2

[Production of Film Capacitor]

Samples 21 to 24 were prepared under the conditions shown in Table 2.

In Example 2, a film capacitor was produced in the same manner as in Example 1 except that the thickness of the dielectric resin film (film thickness after curing) was changed to 0.5 μm, 1 μm, 10 μm, and 11 μm.

[Judgment Method]

The following tests were performed on the film capacitors of Samples 21 to 24.

In Judgment 1, Judgment 2 and Judgment 3, the same test as in Example 1 was conducted.

In Judgment 4, a 10 cm×10 cm film was produced as a coating film during film formation, and the number of coating film defects (cracks) was measured by observation with an optical microscope. A case where the number of defects was 0 was evaluated as ○ (good), a case where the number of defects was 1 to 2 was evaluated as Δ (not so good), and a case where the number of defects was 3 or more was evaluated as x (poor).

For Sample 23 having a film thickness of less than 1 μm, the result of Judgment 3 was evaluated as Δ. This is presumably because the film becomes brittle when the film is too thin.

On the other hand, for Sample 24 having a film thickness exceeding 10 μm, the result of Judgment 4 was evaluated as Δ. This is presumably because if the film is too thick, the amount of a solvent contained in an uncured film increases and cracks are likely to occur during curing.

Example 3

[Production of Film Capacitor]

Samples 31 to 33 were prepared under the conditions shown in Table 3.

In Sample 31, polyvinyl acetoacetal (PVAA) was used as the first organic material (shown as Organic material 1 in Table 3), and tolylene diisocyanate (TDI) was used as the second organic material (shown as Organic material 2 in Table 3).

As TDI, trimethylpropanol-modified tolylene diisocyanate was used.

In Sample 32, a phenoxy resin was used as the first organic material, and a melamine resin was used as the second organic material. As the phenoxy resin, a phenoxy resin which was a high molecular weight bisphenol A type epoxy resin having an epoxy group at the terminal was used. As the melamine resin, an alkylated melamine resin was used.

In Sample 33, a phenoxy resin was used as the first organic material, and an epoxy resin was used as the second organic material. As the phenoxy resin, a phenoxy resin which was a high molecular weight bisphenol A type epoxy resin having an epoxy group at the terminal was used. As the epoxy resin, a novolac type epoxy resin was used. In order to advance the curing reaction, 0.1% imidazole catalyst was added as a catalyst.

[Judgment Method]

The following tests were performed on the film capacitors of Samples 31 to 33.

In Judgment 1 and Judgment 2, the same test as in Example 1 was conducted.

TABLE 2

| Sample No. | Organic material 1 Phenoxy [wt %] | Organic material 2 MDI [wt %] | Heat treatment condition | Storage elastic modulus E'@125° C. [GPa] | Thickness [μm] | Tg [° C.] | Storage elastic modulus E'225° C. [Pa] | Crosslink density [mol/m³] | Judgment 1 | Judgment 2 | Judgment 3 | Judgment 4 |
|---|---|---|---|---|---|---|---|---|---|---|---|---|
| 21 | 60 | 40 | 180° C./10 h | 1.5 | 10 | 197 | $6.2 \times 10^7$ | 4994 | ○ | ⊚ | ○ | ○ |
| 22 | 60 | 40 | 180° C./10 h | 1.5 | 1 | 195 | $6.4 \times 10^7$ | 5155 | ○ | ⊚ | ○ | ○ |
| 23 | 60 | 40 | 180° C./10 h | 1.5 | 0.5 | 197 | $6.2 \times 10^7$ | 4994 | ○ | ⊚ | Δ | ○ |
| 24 | 60 | 40 | 180° C./10 h | 1.5 | 11 | 195 | $6.4 \times 10^7$ | 5155 | ○ | ⊚ | ○ | Δ |

TABLE 3

| Sample No. | Constituent material | | Mixing ratio [wt %] | | Heat treatment condition | Storage elastic modulus E'@125° C. [GPa] | Thickness [μm] | Tg [° C.] | Storage elastic modulus E'@225° C. [Pa] | Crosslink density [mol/m³] | Judgment 1 | Judgment 2 |
|---|---|---|---|---|---|---|---|---|---|---|---|---|
| | Organic material 1 | Organic material 2 | Organic material 1 | Organic material 2 | | | | | | | | |
| 31 | PVAA | TDI | 40 | 60 | 180° C./5 h | 1.6 | 3 | 197 | $4.0 \times 10^7$ | 3222 | ○ | ○ |
| 32 | Phenoxy | Melamine | 40 | 60 | 180° C./5 h | 1.5 | 3 | 182 | $4.2 \times 10^7$ | 3383 | ○ | ○ |
| 33 | Phenoxy | Epoxy | 40 | 60 | 180° C./5 h | 1.5 | 3 | 185 | $3.5 \times 10^7$ | 2819 | ○ | ○ |

From Table 3, it was confirmed that the same results as in Example 1 were obtained.

DESCRIPTION OF REFERENCE SYMBOLS

1: Film capacitor
11: First dielectric resin film
12: Second dielectric resin film
21: First counter electrode (first metal layer)
22: Second counter electrode (second metal layer)
31: First external terminal electrode
32: Second external terminal electrode
41: Metal layer
42: Dividing slit
43: Electrode portion
44: Fuse portion

The invention claimed is:

1. A film capacitor comprising:
a dielectric resin film; and
a metal layer on one surface of the dielectric resin film,
wherein the dielectric resin film has a crosslink density at 225° C. being calculated by:

$$n = E'/3\Phi RT,$$

wherein n is the crosslink density, E' is a storage elastic modulus of the dielectric resin film at 225° C. and is $3.4 \times 10^7$ to $6.7 \times 10^7$ Pa, T is 498 K and corresponds to an absolute temperature of 225° C., Φ is 1, and R is 8.31 J/mol·K, and
wherein the dielectric resin film has a thickness of 1 μm to 10 μm.

2. The film capacitor according to claim 1, wherein the crosslink density is 3000 mol/m³ to about 5300 mol/m³.

3. The film capacitor according to claim 1, wherein the dielectric resin film includes at least one of an isocyanate group and a hydroxyl group.

4. The film capacitor according to claim 1, wherein the metal layer has a fuse portion.

5. A film for a film capacitor, the film having a crosslink density at 225° C. being calculated by:

$$n = E'/3\Phi RT,$$

wherein n is the crosslink density, E' is a storage elastic modulus of the dielectric resin film at 225° C. and is $3.4 \times 10^7$ to $6.7 \times 10^7$ Pa, T is 498 K and corresponds to an absolute temperature of 225° C., Φ is 1, and R is 8.31 J/mol·K, and
wherein the film has a thickness of 1 μm to 10 μm.

6. The film for a film capacitor according to claim 5, wherein the crosslink density is 3000 mol/m³ to about 5300 mol/m³.

7. The film for a film capacitor according to claim 5, wherein the film is mainly composed of a resin having at least one of a urethane bond and a urea bond.

8. The film for a film capacitor according to claim 5, wherein the film is mainly composed of a curable resin.

9. The film for a film capacitor according to claim 5, wherein the film comprises at least one of an isocyanate group and a hydroxyl group.

10. The film for a film capacitor according to claim 5, further comprising a metal layer having a fuse portion on one surface of the film.

\* \* \* \* \*